(12) United States Patent
Asano (10) Patent No.: US 7,236,669 B2
(45) Date of Patent: Jun. 26, 2007

(54) FIBER FUSE STOPPER

(75) Inventor: Kenichiro Asano, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/095,505

(22) Filed: Apr. 1, 2005

(65) Prior Publication Data

US 2005/0220423 A1 Oct. 6, 2005

(30) Foreign Application Priority Data

| Apr. 6, 2004 | (JP) | ............................. 2004-112098 |
| Jun. 2, 2004 | (JP) | ............................. 2004-164456 |

(51) Int. Cl.
*G02B 6/26* (2006.01)

(52) U.S. Cl. ............................... 385/50; 385/74

(58) Field of Classification Search .................. 385/33, 385/34, 50, 147, 88, 93, 74
See application file for complete search history.

(56) References Cited

U.S. PATENT DOCUMENTS

| 4,496,211 | A | * | 1/1985 | Daniel | ........................ 385/31 |
| 5,291,570 | A | * | 3/1994 | Filgas et al. | .................. 385/78 |
| 5,481,634 | A | | 1/1996 | Anderson et al. | |
| 6,247,851 | B1 | * | 6/2001 | Ichihara | ....................... 385/56 |
| 6,922,504 | B2 | * | 7/2005 | Yano | ............................ 385/33 |
| 2002/0159694 | A1 | | 10/2002 | Yano | |

FOREIGN PATENT DOCUMENTS

| CN | 1115527 A | | 1/1996 |
| JP | 02281210 A | * | 11/1990 |
| JP | 2001-104929 A | | 4/2001 |
| JP | 2002-372636 A | | 12/2002 |
| JP | 2004-093990 A | | 3/2004 |

* cited by examiner

*Primary Examiner*—Sarah Song
(74) *Attorney, Agent, or Firm*—Sughrue Mion, PLLC (57) ABSTRACT

A fiber fuse stopper includes a connecting member that connects two optical fibers. The optical fibers operatively connect with one another through a physical connection with a graded index lens. The graded index lens has a larger mode field diameter than the mode field diameters of the two optical fibers.

13 Claims, 4 Drawing Sheets

FIBER FUSE STOPPER

CROSS-REFERENCE TO RELATED APPLICATIONS

Priority is claimed from Japanese Patent Application No. 2004-112098, filed Apr. 6, 2004, and Japanese Patent Application No. 2004-164456, filed Jun. 2, 2004, the contents of which are incorporated herein by reference.

BACKGROUND OF THE INVENTION

1. Field of the Invention

The present invention relates to a fiber fuse stopper (fiber fusion preventing device) that protects fiber waveguides or components in a system in which high-power light is transmitted through a fiber waveguide, for example, in the fields of optical communications, laser beam machining, or the like.

2. Description of Related Art

In recent years, a significant increase in the transmission capacity of communication paths has been achieved in the field of optical communications. With this increase in transmission capacity, the intensity of the light propagating through optical fibers or optical devices has been increased. Such intensified light has created new problems in that minute dust particles or the like that are attached to the optical coupling ends may cause "fiber fuse," namely, melting of affected portions of the fiber and subsequent fusion thereof to adjacent components. Fiber fuse can result in destruction of not only the optical transmission path but also optical devices or apparatuses connected thereto (see Seo et al., 2003 Society Conference of IEICE/the Institute of Electronics, Information and Communication Engineers, p. 321; Seo et al., National Fiber Optics Engineers Conference, 2003 Technical Proceedings, p. 22–30; Maeda et al., 2003 Society Conference of IEICE/the Institute of Electronics, Information and Communication Engineers, p. 320; D. P. Hand and P. St. J. Russell, OPTICS LETTERS, Vol. 13, No. 9, September 1988, pp. 767–769, for example).

In order to solve such problems, a technique has been proposed that is described in Japanese Unexamined Patent Application, First Publication No. 2002-372636. In the technique described in Japanese Unexamined Patent Application, First Publication No. 2002-372636, fiber fuse is prevented by providing a core-enlarged portion in some region of an optical fiber to enlarge the mode field diameter (MFD) so that the optical energy density is reduced.

However, the technique described in Japanese Unexamined Patent Application, First Publication No. 2002-372636 has the following shortcomings:

When an optical fiber is heated to enlarge the core thereof, the fiber is required to be heated to a relatively high temperature for a relatively long time, which disadvantageously incurs an increase in the manufacturing cost. In addition, the strength of the fiber may be reduced because the coating of the optical fiber must be removed in a central region of the fiber, and because the optical fiber is heated. As a result, the optical fiber may become prone to breakage under normal operating conditions, which may decrease the reliability of the entire system. Furthermore, providing reinforcing members for reinforcing the region of the fiber in which the strength is reduced may incur an increase in cost.

Two factors are responsible for fiber fuse: increased optical energy of light propagating in cores and conduction of heat. The allowable light intensity of the system is limited since the above-described technique can reduce the factor of the optical energy in cores while it cannot address the factor of thermal conduction. In addition, in a typical optical fiber, such as a single-mode optical fiber, since the achievable enlargement of the mode field diameter (MFD) by the diffusion of dopants is three times the original size at best, the reduction of the optical energy density is one ninth at maximum. Thus, the reduction in achievable optical energy density is limited, and applications of this technique are accordingly limited.

Furthermore, in the above-described technique, an optical fiber having a core enlarged portion at the center thereof is provided, and optical connection means are provided at the two ends of the optical fiber for connecting to a transmission line or to a transmission unit or device. This adds an additional junction, which may incur splice loss or disadvantage in production costs. In addition, if the optical fiber is connected to a transmission unit in a housing external to the transmission unit, an enlarged footprint for the installation the external housing is required. Furthermore, in a case in which the connection is achieved within an apparatus, replacing fiber fuse stoppers (fiber fusion preventing devices) requires considerable labor if fiber fuse occurs.

In addition, the above-described technique has further shortcomings as follows:

As described above, two factors are responsible for fiber fuse: increased optical energy of light propagating in cores and conduction of heat. The allowable light intensity of the system is limited since the above-described technique can reduce the factor of the optical energy in cores while it cannot address the factor of thermal conduction. One study reports that optical fibers can withstand light intensity up to $10 \text{ GW/cm}^2$ or higher, and to prevent fiber fuse, removal of heat may be more effective than reducing the optical energy density. In addition, in a typical optical fiber, such as a single-mode optical fiber, since the achievable enlargement of the mode field diameter (MFD) by the diffusion of dopants is three times the original size at best, the reduction of the optical energy density is one ninth at maximum. Thus, the reduction in achievable optical energy density is limited, and applications of this technique are limited.

When an optical fiber is heated to enlarge a core thereof, the fiber is required to be heated to a relatively high temperature for a long time, which disadvantageously incurs an increase in the manufacturing cost. In addition, the strength of the fiber may be reduced because the coating of the optical fiber is removed in a central region of the fiber and because the optical fiber is heated. As a result, the optical fiber may become prone to breakage under normal operating conditions, which may decrease the reliability of the entire system.

SUMMARY OF THE INVENTION

A first aspect of the present invention was conceived in view of the above-mentioned background, and an object thereof is to provide a fiber fuse stopper, that is, a fiber fusion prevention device, that can be fabricated at low cost, can be applicable to a wide range of light intensities, and can be replaced easily.

To achieve the above-mentioned object, the first aspect of the present invention provides a fiber fuse stopper including a connecting member that connects two optical fibers with the two optical fibers and the connecting member abutted against each other, and a graded index lens that has a larger mode field diameter than the mode field diameters of the two optical fibers, in which the two optical fibers are connected to each other via the graded index lens.

In the fiber fuse stopper according to the first aspect of the present invention, the connecting member may be an optical adapter that connects two optical connectors provided at ends of the optical fibers, and the graded index lens is housed in a split sleeve for securing ferrules.

In the fiber fuse stopper according to the first aspect of the present invention, the connecting member may be a plug jack, and the graded index lens may be housed in a split sleeve for securing ferrules.

In the fiber fuse stopper according to the first aspect of the present invention, an outer periphery of the graded index lens may be covered by a pipe so that an outer diameter of the pipe is substantially the same as an outer diameter of the ferrules.

Since the fiber fuse stopper according to the first aspect of the present invention does not require an extra step of removing the coating of the optical fiber nor heating the optical fiber for enlarging the core diameter, the optical fiber is subjected to no such processing, preventing a reduction of mechanical strength or the like, and assuring a high reliability.

In addition, since the graded index lens can enlarge the mode field diameter to a large degree, the range of light intensity which fiber fuse can tolerate can be significantly raised.

Furthermore, the graded index lens is in physical contact (PC) with the optical connectors since the graded index lens is housed in the optical adapter and the graded index lens abuts the two-connector ferrules. Thus, anti-reflection coating, such as an AR coating, provided on the graded index lens or the ends of the optical fibers is not required, and fiber fuse stoppers can be manufactured at low cost.

Furthermore, the fiber fuse stopper of the present invention can be produced at low cost since no additional connector or junction is necessary. It also has the following advantageous properties:

The fiber fuse stopper of the present invention does not incur an increase in coupling loss since no additional connector or junction is necessary.

Since the graded index lens is housed in the optical adapter, components can be replaced easily without considerable effort when fiber fuse occurs.

Since the graded index lens is housed in the optical adapter, additional footprint required for an installation of an extra housing is not required.

In addition, the fiber fuse stopper of the present invention can be easily applied to conventional systems by providing a graded index lens in a connecting member, such as a plug jack or mechanical splice.

A second aspect of the present invention was conceived in view of the above-mentioned background, and an object thereof is to provide a fiber fuse stopper that can be fabricated at low cost and can be applicable to a wide range of light intensities.

To achieve the above-mentioned object, the second aspect of the present invention provides a fiber fuse stopper including an optical fiber having a coating-stripped region, the coating-stripped region being stripped of a coating to expose a bare optical fiber, and a cooling member, the cooling member being provided with a groove for receiving the bare optical fiber of the coating-stripped region, wherein the bare optical fiber of the coating-stripped region is cooled by the cooling member.

In the fiber fuse stopper according to the second aspect of the present invention, the bare optical fiber received in the groove of the cooling member may be secured using an adhesive.

In the fiber fuse stopper according to the second aspect of the present invention, the bare optical fiber may be coated with a metal coating, and the bare optical fiber coated with the metal coating may be secured into the groove of the cooling member using a solder.

In the fiber fuse stopper according to the second aspect of the present invention, the bare optical fiber received in the groove of the cooling member may be secured using a low-melting glass.

In the fiber fuse stopper according to the second aspect of the present invention, the bare optical fiber may be secured in the groove of the cooling member by pressing the bare optical fiber received into the groove of the cooling member into the groove.

In the fiber fuse stopper according to the second aspect of the present invention, the cooling member may include a cooling and heat transfer member.

In the fiber fuse stopper according to the second aspect of the present invention, the cooling member may include a cooling fin.

Since the fiber fuse stopper of the second aspect of the present invention prevents fiber fuse by directly cooling the optical fiber, rather than decreasing the optical energy density, it is applicable to a wide range of systems and a wide range of light intensities.

Furthermore, the optical fiber is not subjected to thermal history problems, such as can be induced by heating, during the fabrication of the fiber fuse stopper, thus preventing loss of mechanical strength or the like of the optical fiber and assuring a high reliability.

Furthermore, since certain manufacturing process steps required by the conventional approach, such as a step of heating the optical fiber, can be omitted, the fiber fuse stopper can be provided at low cost.

DETAILED DESCRIPTION OF THE INVENTION

FIRST EMBODIMENT

Hereinafter, a first embodiment of the present invention will be described with reference to the drawings.

A fiber fuse stopper according to the first embodiment of the present invention includes a connecting member that abuts two optical fibers for connecting them and a graded index lens provided in the connecting member, in which the two optical fibers are connected via the graded index lens. The graded index lens has a larger mode field diameter than the mode field diameters of the optical fibers. Examples of the connecting member include optical adapters that connect optical connectors that are provided at ends of optical fibers to be connected, plug jacks, mechanical splices, or the like.

Figure 1:
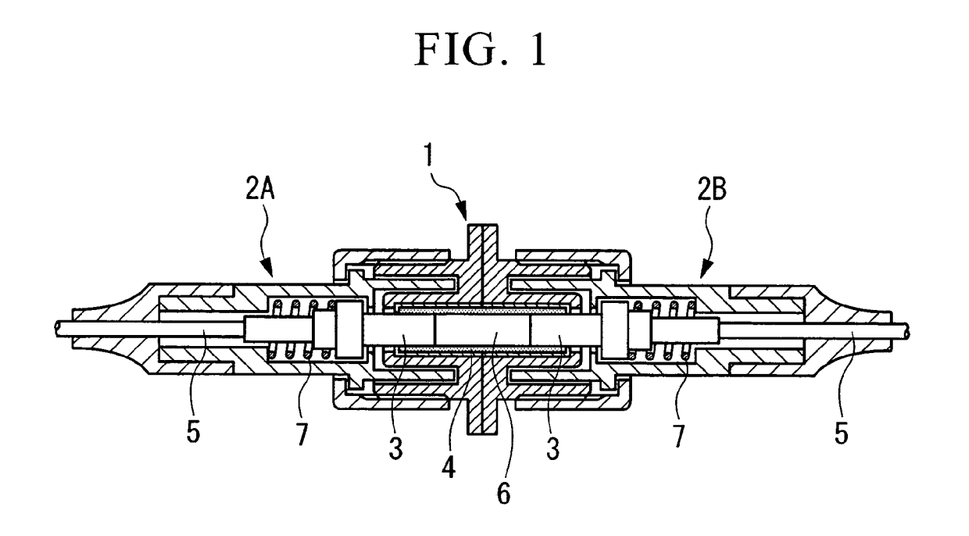
FIG. 1 is a cross-sectional view illustrating an optical adapter having a first example of a fiber fuse stopper according to a first embodiment of the present invention.

FIG. 1 is a cross-sectional view illustrating a first example of the fiber fuse stopper according to the first embodiment of the present invention. In this example, the connecting member is an optical adapter 1 that connects two optical connectors 2A and 2B that are provided at ends of optical fibers 5. A graded index lens 6 is housed in a split sleeve 4 that secures ferrules 3, and the ends of optical fibers that are exposed at the center of the ends of the ferrules 3 and the graded index lens 6 are abutted against each other so that the optical fibers 5 are connected to each other via the graded index lens 6.

The optical adapter 1 has openings with which the optical connectors 2A and 2B are mated, and the split sleeve 4 at the center of which the graded index lens 6 is received. The optical connectors 2A and 2B mated with the optical adapter 1 guide the ends of the ferrules 3 into the split sleeve 4 so that ends of the ferrules 3 and an end of the graded index lens 6 are abutted against each other. To hold the ends of the optical fibers in abutment with the respective surfaces of the graded index lens 6, springs 7 are provided in respective ones of the optical connectors 2A and 2B. The springs 7 provide an elastic force such that the ends of the optical fibers exposed at the center of the ends of the ferrules 3 and the graded index lens 6 are pressed into abutment and held in close in physical contact (PC).

Any optical connectors known in the art may be used as the optical connector 2A and 2B. Specifically, the present invention may be practiced for any type of conventional optical connectors, for example, SC-, FC-, MU-, and LC-type optical connectors.

Furthermore, the ferrules 3 may be made of any materials and may have any dimensions. Any of the conventionally used ferrules for optical connectors may be used in the practice of the present invention.

Also, any suitable optical adapter may be used as the optical adapter 1 according to the selection of the optical connectors 2A and 2B.

Moreover, any of conventionally used split sleeves may be used as the split sleeve 4 according to the external shape or dimensions or the like of the ferrules 3.

The graded index lens 6 is a cylindrical-shaped lens that has a refractive index profile in the radial direction, and is sometimes referred to as a GRIN lens or rod lens. As for the graded index lens 6, a lens made of multi-component glass, such as Selfoc (a trademark of Nippon Sheet Glass Co., Ltd. ), or a graded index lens made of silica-based glass that is disclosed in Japanese Patent Application No. 2001-104929 filed by the present applicants. Among graded index lenses disclosed in Japanese Unexamined Patent Application, First Publication No. 2004-93990, filed by the present applicants, a graded index lens having a pitch of 0.5 is preferably used, for example. It should be noted that one pitch of a graded index lens is one cycle of a sinusoidal wave of the path of the light traveling through the graded index lens.

The graded index lens 6 preferably has an outer diameter substantially the same as the outer diameter of ferrules 3 so that the graded index lens 6 can be housed in the split sleeve 4 without requiring an extra member for housing the graded index lens 6.

When the outer diameter of the graded index lens 6 is smaller than that of the ferrules 3, it is preferable that the graded index lens 6 be housed in the split sleeve 4 after the split sleeve 4 is covered with a pipe made of a metal, ceramic, resin, or the like, so that the covered lens has the same outer diameter as those of the ferrules 3.

The fiber fuse stopper for an optical adapter according to the present invention is constructed such that the ends of the graded index lens 6 contact the fiber ends of an optical connector, and the graded index lens 6 enlarges to a large degree the mode field diameter of the optical fiber 5. Thus, the range of light intensity over which fiber fuse is prevented can be significantly increased. For example, with the silica rod lens described in Japanese Unexamined Patent Application, First Publication No. 2004-93990, a mode field diameter of a lens 0.4 mm in diameter is about 150 µm, and the optical energy density is reduced to about $1/200$. Thus, such a lens can withstand a light intensity of about 20 times higher than the above-described conventional fiber fuse stoppers that inhibit fiber fuse by expanding the cores of optical fibers. Furthermore, by using lenses that have a diameter of 2.5 mm that equals to the outer diameter of ferrules, it is possible to reduce the optical energy density to about $1/15,000$. Thus, such a lens can withstand a light intensity of about 1,500 times higher than the above-described conventional fiber fuse stoppers that inhibit fiber fuse by expanding the cores of optical fibers.

A fiber fuse stopper having the above-described optical adapter 1 functions as a common optical junction during normal operation. In other words, the light transmitted through one of the optical fibers 5 is sent to another optical fiber 5 via the connectors 2A and 2B and the graded index lens 6 interposed between the ferrules 3 of the connectors 2A and 2B. When conditions which could otherwise cause fiber fuse to occur, the light emitted from the optical connector is enlarged by the graded index lens 6 so that the optical energy density is reduced in order to prevent fiber fuse.

Since the fiber fuse stopper according to the present invention does not require an extra step of removing the coating of the optical fiber 5 nor heating the optical fiber for enlarging the core diameter in order to prevent fiber fuse, there is no loss of mechanical strength or the like of the optical fiber 5, thus assuring a high reliability.

In addition, since the graded index lens 6 can enlarge the mode field diameter to a large degree, the range of light intensity over which fiber fuse is prevented is significantly increased.

Furthermore, the graded index lens 6 is in physical contact (PC) with the optical connectors 2A and 2B since the graded index lens 6 is housed in the optical adapter 1 and the graded index lens 6 is abutted against two connector ferrules 3. Thus, no anti-reflection coating, such as an AR coating, provided on the graded index lens or the ends of the optical fibers is required, and fiber fuse stoppers can be manufactured at low cost.

Also, as compared to conventional fiber fuse stoppers, the fiber fuse stopper of the present invention can be provided at low cost since no additional connector or junction is necessary.

Moreover, as compared to conventional fiber fuse stoppers, the fiber fuse stopper of the present invention does not incur an increase in coupling loss since no additional connector or junction is necessary.

Furthermore, since the graded index lens 6 is housed in the optical adapter 1, components can be replaced easily without considerable effort should fiber fuse occur.

Also, since the graded index lens 6 is housed in the optical adapter 1, no space is required for installation of an extra housing.

Figure 2:
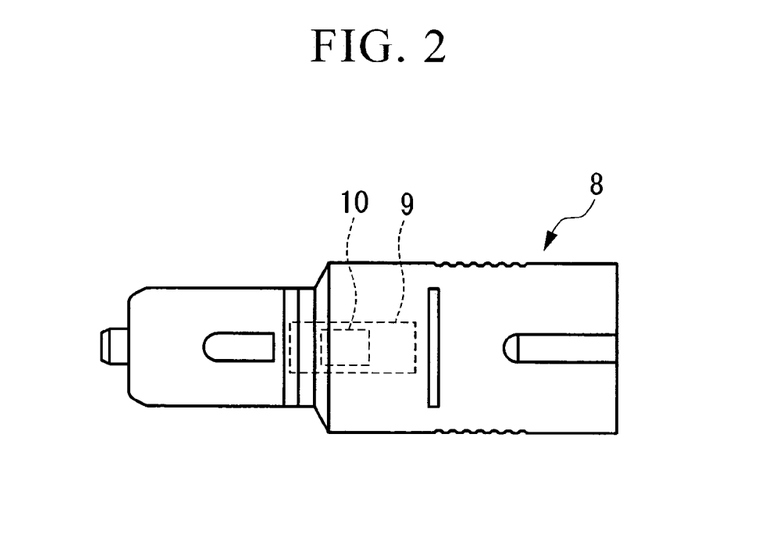
FIG. 2 is a side view illustrating a plug jack having a second example of the fiber fuse stopper according to the first embodiment of the present invention.

FIG. 2 is a side-view illustrating a second example of the fiber fuse stopper according to the first embodiment of the present invention. In this example, the connecting member is a plug jack 8, and a graded index lens 10 is housed in a split sleeve 9 for securing a ferrule.

The plug jack 8 may be connected to an optical fiber of a device to be connected, and an optical connector (not shown) may be detachably connected to an end of another optical fiber. In this manner, the two optical fibers and the graded index lens 10 are abutted against each other so that the optical fibers are connected to each other via the graded index lens 10.

Similar to the optical adapter I of the first example described above, in the plug jack 8, if conditions occur which would otherwise cause fiber fuse to occur, because the light emitted from the optical connector is enlarged by the graded index lens 10 the optical energy density is reduced, thereby preventing fiber fuse.

It should be noted that, as a variation of this second example, a fiber fuse stopper having a graded index lens can be provided inside a mechanical splice.

The fiber fuse stopper of the second example provides substantially the same advantageous effects as the fiber fuse stopper of the first example. In addition, the present invention can be easily applied to conventional systems by providing a graded index lens within a connecting member, such as a plug jack or mechanical splice.

Second Embodiment

Hereinafter, a second embodiment of the present invention will be described with reference to the drawings.

Figure 3:
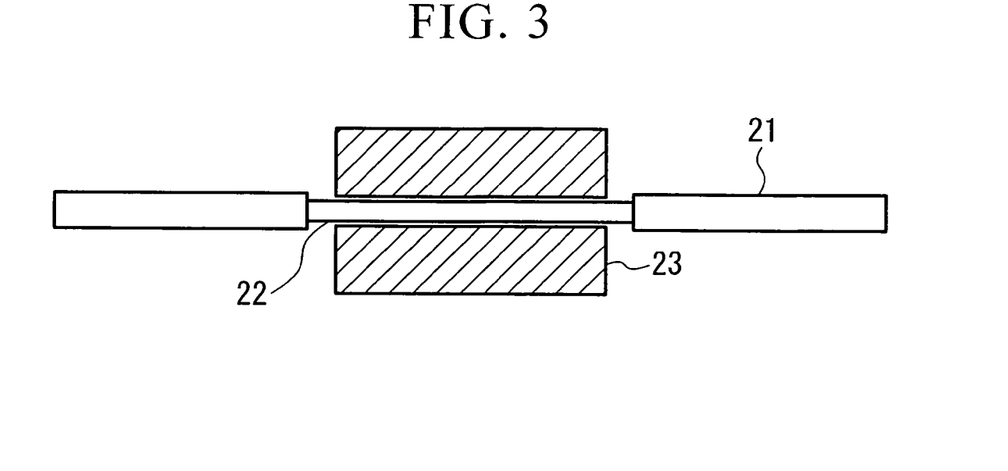
FIG. 3 is a schematic side view illustrating a fiber fuse stopper according to a second embodiment of the present invention.

FIG. 3 is a schematic side view of a fiber fuse stopper according to the second embodiment of the present invention. The fiber fuse stopper has an optical fiber 21 that is provided in a coating-stripped region in which a part of the coating of the optical fiber 2 is stripped away, and a cooling member 23 that is provided with a groove for receiving the bare optical fiber of the coating-stripped region 22. The bare fiber is cooled due to contact with the cooling member 23.

The optical fiber 21 may be an optical fiber for an optical fiber transmission path. Alternatively, a fiber fuse stopper may be fabricated using an optical fiber 21 in an adequate length, and the fiber fuse stopper may be used to connect optical fibers that are used for an optical fiber transmission path or the like. Furthermore, the optical fiber 21 may be either a single core type, or a multiple core type, such as an optical fiber ribbon.

The length of the coating-stripped region 22 on the optical fiber 21 is preferably larger to some extent than the length of the cooling member 23 so that the coating-stripped region 22 can be easily secured by the cooling member 23 during the fabrication of the fiber fuse stopper. After fabricating the fiber fuse stopper, some of the coating-stripped region 22 may be exposed at the two ends of the cooling member 23, and such exposed regions may be coated with a resin, such as an ultraviolet-curing resin.

The cooling member 23 having a groove for receiving a bare fiber may be made of any known materials provided that the cooling member 23 can rapidly cool the optical fiber 21 to prevent fusion. Preferable materials of the cooling member 23 include, for example, metals such as copper, aluminum, stainless steel, or iron, silicon, ceramics such as alumina or aluminum nitride or heating-conducting graphite.

In the fiber fuse stopper, the cooling member 23, made of a material that exhibits excellent thermal conduction, such as a metal, contacts the coating-stripped region 22 of the optical fiber 21. This helps to decrease the temperature of the optical fiber 21 by dissipating heat from the optical fiber 21, thereby preventing or stopping the progression of fiber fuse.

Figure 4A:
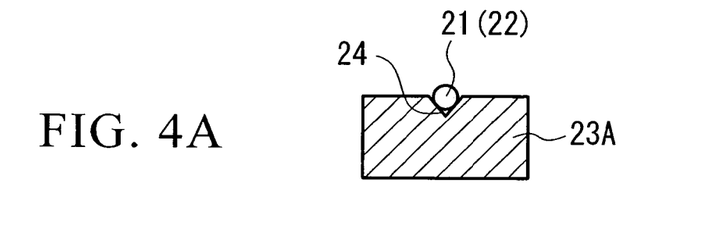
FIGS. 4A to 4C are cross-sectional views illustrating examples of a fiber fuse stopper according to the second embodiment of the present invention.
Figure 5A:
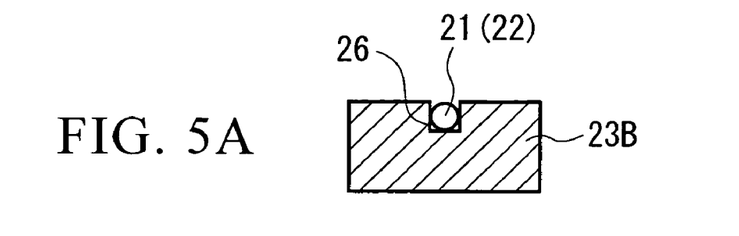
FIGS. 5A and 5B are cross-sectional views illustrating other examples of a fiber fuse stopper according to the second embodiment of the present invention.
Figure 5B:
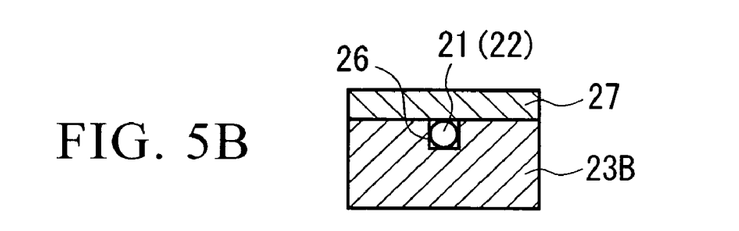
Figure 6A:
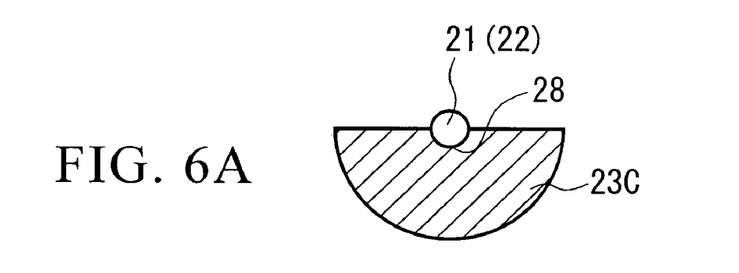
FIGS. 6A and 6B are cross-sectional views illustrating other examples of a fiber fuse stopper according to the second embodiment of the present invention.
Figure 6B:
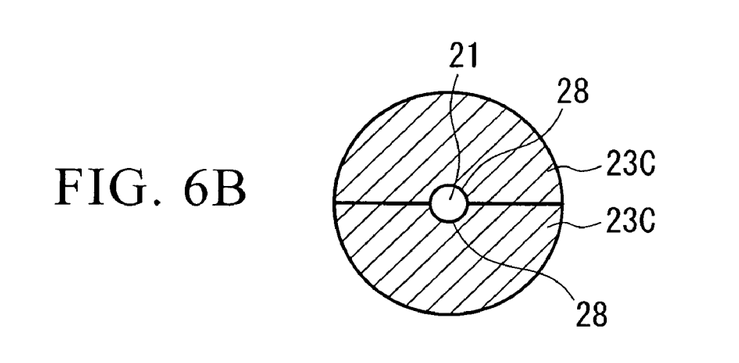
Figure 7A:
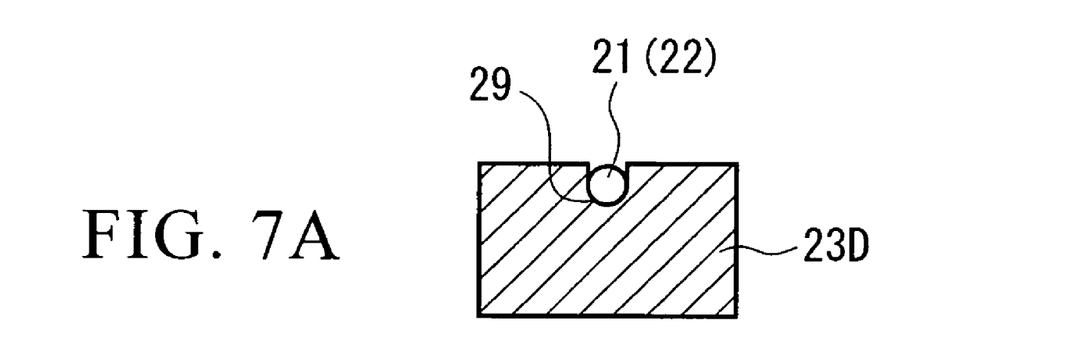
FIGS. 7A and 7B are cross-sectional views illustrating other examples of a fiber fuse stopper according to the second embodiment of the present invention.
Figure 7B:
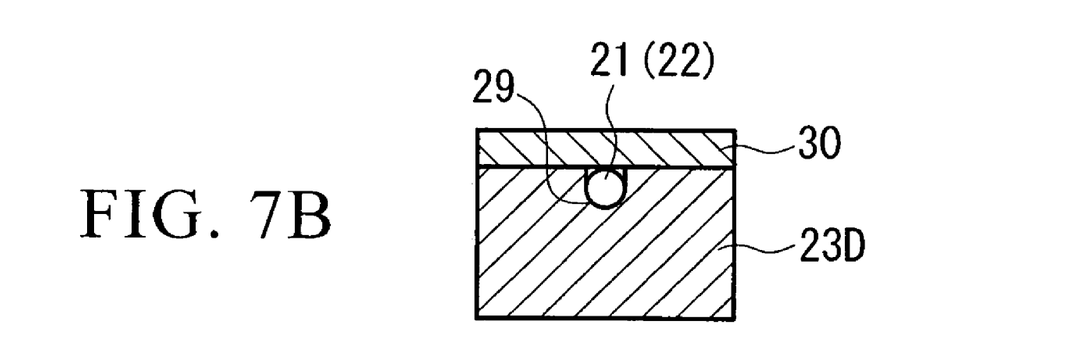

FIG. 4A to 7B are cross-sectional views of examples of a fiber fuse stopper according to the second embodiment of the present invention. FIGS. 4A to 4C illustrate examples of a fiber fuse stopper having a cooling member 23A on which a V-shaped groove 24 is provided. FIGS. 5A and 5B illustrate examples of a fiber fuse stopper having a cooling member 23B on which a square-shaped groove 26 is provided. FIGS. 6A and 6B illustrate examples of a fiber fuse stopper having a cooling member 23C on which a round-shaped groove 28 is provided. FIGS. 7A and 7B illustrate examples of a fiber fuse stopper having a cooling member 23D on which a U-shaped groove 29 is provided.

FIG. 4A is a cross-sectional view of a first example of a fiber fuse stopper according to the second embodiment of the present invention.

In the first example, the bare fiber of the coating-stripped region 22 of the optical fiber 21 is received in a V-shaped groove 24 provided on the cooling member 23A, and the bare fiber is secured in the V-shaped groove 24 using an adhesive. Any known adhesive may be used, and adhesives that have excellent thermal conductivity after curing are preferred.

The method for securing the bare fiber of the optical fiber 21 in the V-shaped groove 24 is not particularly limited to the method using adhesives. Alternatively, for example, the bare fiber may be coated with a metal coating, and the optical fiber coated with the metal coating may be secured in the V-shaped groove 24 of the cooling member 23A using a solder after placing the bare fiber in the V-shaped groove. Alternatively, the coated fiber may be secured in the V-shaped groove 24 using a low-melting point glass.

In the fiber fuse stopper of the first example, the coating-stripped region 22 of the optical fiber 21 is received in the V-shaped groove 24 of the cooling member 23 so that the bare fiber in the V-shaped groove 24 is secured therein such that the cooling member 23A, made of a material that exhibits an excellent thermal conduction such as a metal, contacts the bare fiber of the optical fiber 21. This helps to decrease the temperature of the optical fiber 21 by dissipating heat from the optical fiber 21, thereby preventing fiber fuse.

Since the fiber fuse stopper of the first example prevents fiber fuse by directly cooling the optical fiber 21 (rather than by decreasing the optical energy density), it is applicable to a wide range of systems and a wide range of light intensities.

Furthermore, since the optical fiber 21 is not subjected to thermal history problems, such as may be induced by heating during the fabrication of the fiber fuse stopper, there is no reduction of mechanical strength or the like of the optical fiber 21, thus assuring a high reliability.

Furthermore, since no step of heating the optical fiber 21 is required, the fiber fuse stopper can be provided at low cost.

Figure 4B:
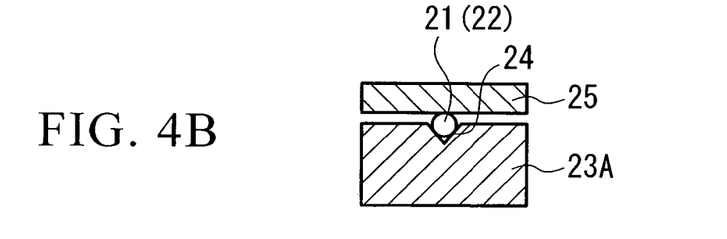

FIG. 4B is a cross-sectional view of a second example of the fiber fuse stopper according to the second embodiment of the present invention.

In the fiber fuse stopper of the second example, the cooling member 23A includes a cover 25 for pressing the bare fiber into place. That is, after the bare fiber of the coating-stripped region 22 of the optical fiber 21 is received in the V-shaped groove 24 of the cooling member 23A, the cover 25 is closed so that the bare fiber is pressed into the V-shaped groove 24 by the cover 25 and thus secured in the cooling member 23A.

The fiber fuse stopper of the second example provides advantageous effects similar to those of the fiber fuse stopper of the first example. In addition, since the bare fiber of the optical fiber 21 is secured by the cooling member 23A having the cover, the optical fiber 21 easily can be removed from the cooling member 23A after the installation. Thus, fiber fuse stoppers can be replaced easily during work to switch between optical fiber transmission paths.

Figure 4C:
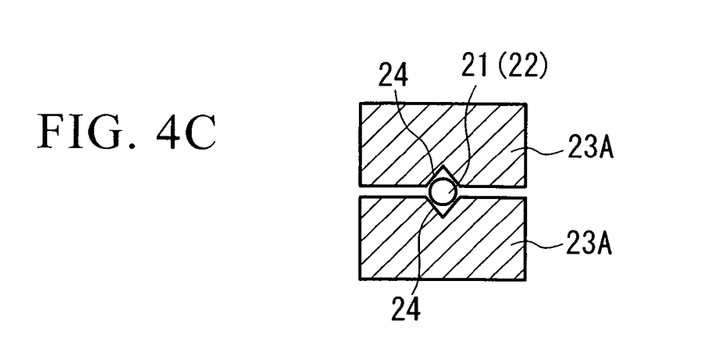

FIG. 4C is a cross-sectional view of a third example of the fiber fuse stopper according to the second embodiment of the present invention.

In the fiber fuse stopper of the third example, two of the cooling member 23A having the V-shaped groove 24 are used, and the bare fiber of the coating-stripped region 22 of the optical fiber 21 is received in respective V-shaped grooves 24 of the cooling members 23A. The two cooling members 23A may be attached together.

The fiber fuse stopper of the third example provides advantageous effects similar to those of the fiber fuse stopper of the first example. In addition, the two cooling members 23A enhance the capability to cool the optical fiber 21 compared to a single cooling member.

FIG. 5A is a cross-sectional view of a fourth example of a fiber fuse stopper according to the second embodiment of the present invention.

In the fourth example, the bare fiber of the coating-stripped region 22 of the optical fiber 21 is received in a square-shaped groove 26 provided on the cooling member 23B, and the bare fiber is secured in the square-shaped groove 26 using an adhesive. Any known adhesive may be used, and adhesives that have excellent thermal conductivity after curing are preferred. The method for securing the bare fiber of the optical fiber 21 in the square-shaped groove 26 is not particularly limited to the method using adhesives. Alternatively, for example, the bare fiber may be coated with a metal coating, and the optical fiber coated with the metal coating secured in the square-shaped groove 26 of the cooling member 23B using a solder after placing the bare fiber in the square-shaped groove. Alternatively, the coated fiber may be secured in the square-shaped groove 26 using a low-melting point glass.

The fiber fuse stopper of the fourth example provides advantageous effects similar to those of the fiber fuse stopper of the first example.

FIG. 5B is a cross-sectional view of a fifth example of the fiber fuse stopper according to the second embodiment of the present invention.

In the fiber fuse stopper of the fifth example, the cooling member 23B includes a cover 27 for pressing the bare fiber into place. That is, after the bare fiber of the coating-stripped region 22 of the optical fiber 21 is received in the square-shaped groove 26 of the cooling member 23B, the cover 27 is closed so that the bare fiber is pressed into the square-shaped groove 26 by the cover 27 and thus secured in the cooling member 23B.

The fiber fuse stopper of the fifth example provides advantageous effects similar to those of the fiber fuse stopper of the first example. In addition, since the bare fiber of the optical fiber 21 is secured by the cooling member 23B having the cover, the optical fiber 21 easily can be removed from the cooling member 23B after installation. Thus, fiber fuse stoppers can be replaced easily during work to switch between optical fiber transmission paths.

FIG. 6A is a cross-sectional view of a sixth example of a fiber fuse stopper according to the second embodiment of the present invention.

In the sixth example, the bare fiber of the coating-stripped region 22 of the optical fiber 21 is received in a round-shaped groove 28 provided on the cooling member 23C, and the bare fiber is secured in the round-shaped groove 28 using an adhesive. Any known adhesive may be used, and adhesives that have excellent thermal conductivity after curing are preferred. The method for securing the bare fiber of the optical fiber 21 in the round-shaped groove 28 is not particularly limited to the method using adhesives. Alternatively, for example, the bare fiber may be coated with a metal coating, and the optical fiber coated with the metal coating secured in the round-shaped groove 28 of the cooling member 23C using a solder after placing the bare fiber in the round-shaped groove. Alternatively, the coated fiber may be secured in the round-shaped groove 28 using a low-melting glass.

The fiber fuse stopper of the sixth example provides advantageous effects similar to those of the fiber fuse stopper of the first example.

FIG. 6B is a cross-sectional view of a seventh example of a fiber fuse stopper according to the second embodiment of the present invention.

In the fiber fuse stopper of the third example, two of the cooling member 23C having the round-shaped groove 28 are used, and the bare fiber of the coating-stripped region 22 of the optical fiber 21 is received in respective round-shaped grooves 28 of the cooling members 23C. The two cooling members 23C may be attached together.

The fiber fuse stopper of the seventh example provides advantageous effects similar to those of the fiber fuse stopper of the first example. In addition, the two cooling members 23C enhance the capability to cool the optical fiber 21 compared to a single cooling member.

FIG. 7A is a cross-sectional view of an eighth example of a fiber fuse stopper according to the second embodiment of the present invention.

In the eighth example, the bare fiber of the coating-stripped region 22 of the optical fiber 21 is received in a U-shaped groove 29 provided on the cooling member 23D, and the bare fiber is secured in the U-shaped groove 29 using an adhesive. Any known adhesive may be used, and adhesives that have excellent thermal conductivity after curing are preferred. The method for securing the bare fiber of the optical fiber 21 in the U-shaped groove 29 is not particularly limited to the method using adhesives. Alternatively, for example, the bare fiber may be coated with a metal coating, and the optical fiber coated with the metal coating may be secured in the U-shaped groove 29 of the cooling member 23D using a solder after placing the bare fiber in the U-shaped groove. Alternatively, the coated fiber may be secured in the U-shaped groove 29 using a low-melting point glass.

The fiber fuse stopper of the eighth example provides advantageous effects similar to those of the fiber fuse stopper of the first example.

FIG. 7B is a cross-sectional view of a ninth example of the fiber fuse stopper according to the second embodiment of the present invention.

In the fiber fuse stopper of the ninth example, the cooling member 23D includes a cover 30 for pressing the bare fiber into place. After the bare fiber of the coating-stripped region 22 of the optical fiber 21 is received in the U-shaped groove 29 of the cooling member 23D, the cover 30 is closed so that the bare fiber is pressed into the U-shaped groove 29 by the cover 25 and the bare fiber is thus secured in the cooling member 23D. The fiber fuse stopper of the ninth example provides advantageous effects similar to those of the fiber fuse stopper of the first example. In addition, since the bare fiber of the optical fiber 21 is secured by the cooling member 23D having the cover, the optical fiber 21 easily can be removed from the cooling member 23D after the optical fiber 21 is secured. Thus, fiber fuse stoppers can be replaced easily during work to switch between optical fiber transmission paths.

It should be noted that above-described embodiments are merely exemplary, and the fiber fuse stopper of the present invention is not limited to those embodiments.

For example, the fiber fuse stopper of the present invention may include a cooling and heat transfer member, such as a heat pipe, provided together with a cooling member.

Furthermore, the fiber fuse stopper according to the second embodiment of the present invention may include a cooling fin provided or the cooling member to enhance the cooling efficiency.

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A fiber fuse stopper comprising:
   a connecting member that connects two optical fibers; and
   a graded index lens that has a mode field diameter larger than a mode field diameter of the two optical fibers; wherein
   said optical fibers are operatively connected with one another via physical contact with the graded index lens by the connecting member.

2. The fiber fuse stopper according to claim 1, wherein the connecting member comprises an optical adapter that connects two optical connectors comprising ferrules provided at ends of the optical fibers, and the graded index lens is housed in a split sleeve that secures said ferrules.

3. The fiber fuse stopper according to claim 2, wherein an outer periphery of the graded index lens is substantially the same as an outer diameter of the ferrules.

4. The fiber fuse stopper according to claim 1, wherein the connecting member comprises a plug jack, ends of said optical fibers comprise ferrules, and the graded index lens is housed in a split sleeve for securing said ferrules.

5. The fiber fuse stopper according to claim 2, wherein an outer periphery of the graded index lens is covered by a pipe so that an outer diameter of the pipe is substantially the same as an outer diameter of the ferrules.

6. A fiber fuse stopper comprising:
   an optical fiber having a coating-stripped region, the coating-stripped region being stripped of a coating to expose a bare portion of the optical fiber;
   a cooling member, the cooling member being provided with a groove in an inner surface of the cooling member for receiving the bare portion of the optical fiber,
   wherein the bare portion of the optical fiber is cooled by the cooling member.

7. The fiber fuse stopper according to claim 6, wherein the bare portion of the optical fiber received in the groove of the cooling member is secured using an adhesive.

8. The fiber fuse stopper according to claim 6, wherein the bare portion of the optical fiber is coated with a metal coating and is secured in the groove of the cooling member with solder.

9. The fiber fuse stopper according to claim 6, wherein the bare portion of the optical fiber received in the groove of the cooling member is secured with glass.

10. The fiber fuse stopper according to claim 6, wherein the bare portion of the optical fiber is secured in the groove of the cooling member by pressing the bare portion of the optical fiber into the groove.

11. The fiber fuse stopper according to claim 6, wherein the cooling member comprises a cooling and heat transfer member.

12. The fiber fuse stopper according to claim 6, wherein the cooling member comprises a cooling fin.

13. The fiber fuse stopper according to claim 6, further comprising:
   a cover for pressing the bare portion of the optical fiber into the groove so that the bare portion of the optical fiber is secured in the groove of the cooling member.

* * * * *